Figure 1:
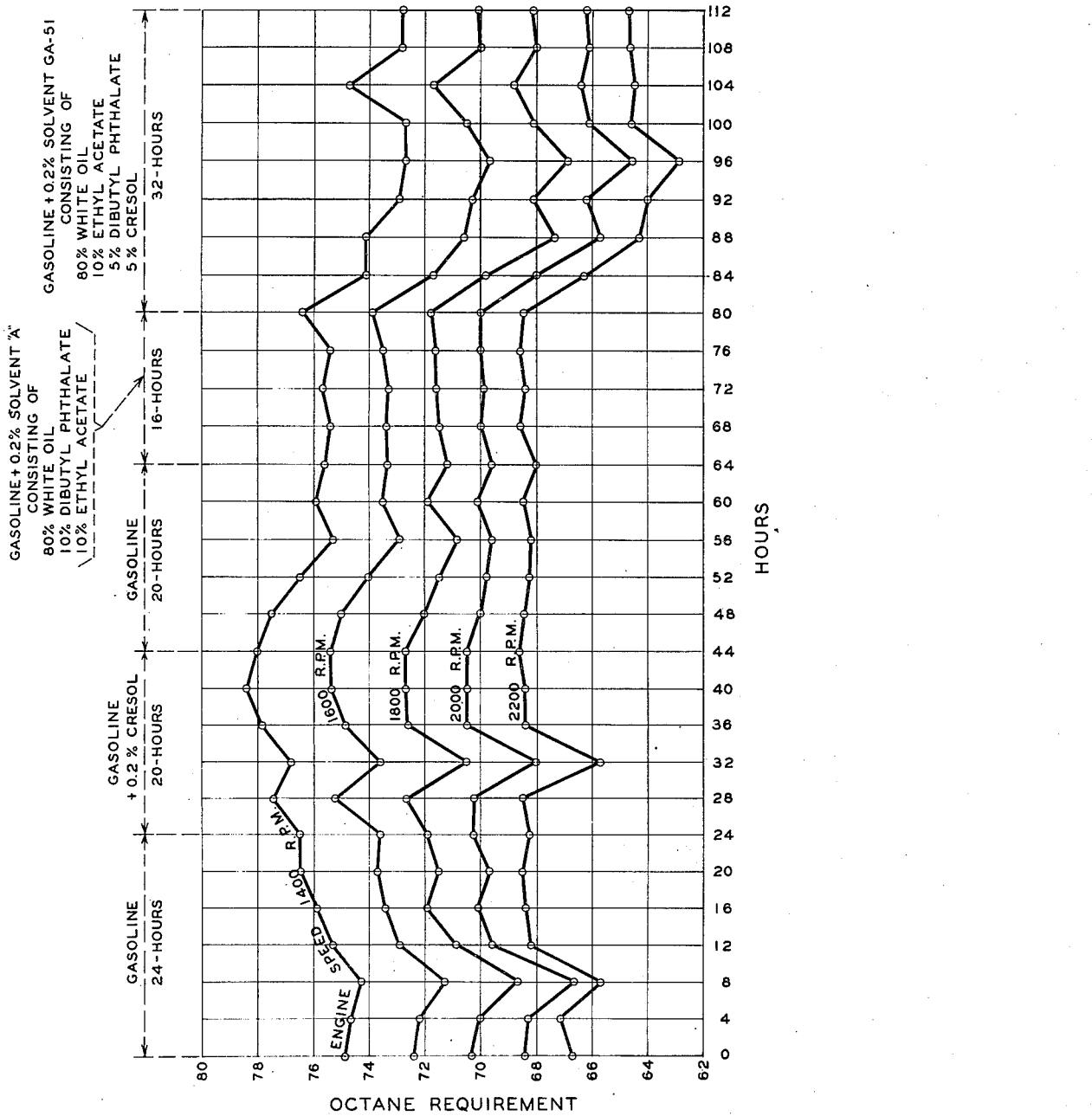

April 20, 1943.  W. J. BACKOFF ET AL  2,316,754
GUM AND CARBON DEPOSIT SOLVENTS AND METHOD OF USING THE SAME
Filed June 9, 1941

INVENTOR.
William J. Backoff
BY Norman D. Williams
Edward H. Lang
ATTORNEY.

Patented Apr. 20, 1943

2,316,754

UNITED STATES PATENT OFFICE 2,316,754

GUM AND CARBON DEPOSIT SOLVENT AND METHOD OF USING THE SAME

William J. Backoff and Norman D. Williams, Chicago, Ill., assignors to The Pure Oil Company, Chicago, Ill., a corporation of Ohio Application June 9, 1941, Serial No. 397,214

14 Claims. (Cl. 44—58)

This invention relates to the method of inhibiting promotion of gum and carbonaceous deposits on, and removing gum and carbonaceous deposits from, mechanical parts, particularly internal combustion engines, and to novel compositions useful in connection therewith.

In the operation of internal combustion engines, there is invariably formed as a result of the conditions of combustion, a deposit in the combustion chamber of the cylinders, on the piston heads, around the valves and also on the spark plugs, which materially interferes with proper and efficient operation of the motor. In the combustion zone the deposit contributes to what is commonly known as knocking of the fuel charge in the cylinders. Similar deposits cause the piston rings and valves to stick. This deposit is commonly referred to as carbon, although it is not composed wholly of carbon but includes other material as mineral matter from road dust drawn into the carburetor, metallic particles, gum and rust, etc. The so-called carbon element of the deposit is largely a result of incomplete combustion of fuel and carbonization of mineral oil. The incomplete combustion of fuel not only accounts for carbon deposition but undoubtedly also accounts for a deposit of gum-like material as well, which under the prevailing conditions may be in a form ranging from a fairly soft gum to a hard, brittle varnish-like substance. For purposes of convenience, the deposits of materials in internal combustion engines described in the foregoing paragraph, will be referred to as carbon deposits.

It has also been noted that motor fuels such as the usual gasolines now on the market, form a deposit of a gum-like residue in the intake system of internal combustion engines. This deposit is usually most noticeable in the intake manifold and around the intake valves, and is generally referred to as gum. This deposition of gum is very objectionable and may be the cause of the improper functioning, or failure to function, of the intake valves whereby the operating efficiency is materially impaired.

It is an object of this invention to provide a method for removing gum and carbonaceous deposits from mechanical parts, particularly from the intake and combustion zones of internal combustion engines.

It is another object of the invention to provide a composition capable of removing gum and carbonaceous deposits from mechanical parts, particularly the intake and combustion zones of internal combustion engines.

It is a further object of this invention to provide a composition which is adapted to be used in conjunction with gasoline or other fuels in internal combustion engines. When this gasoline-solvent fuel mixture is used in internal combustion engines, it effectively minimizes the tendency toward formation of carbon and gum deposits in both the intake system and combustion zone and in those engines where deposits of carbon and gum are already present and are interfering with efficient operation, the deposits are substantially decreased and/or removed, restoring the engine to higher operating efficiency.

Further objects of the invention will appear from the following description when considered in connection with the accompanying drawing of which Figure 1 is a graph illustrating by means of curves, the effect on octane requirement of an automotive engine, of the components used in the novel solvent compositions and a preferred solvent composition in accordance with this invention.

It is known that a number of substances have been used in the past with some degree of success to remove or prevent deposition of carbon and gum in internal combustion engines. As a result of laboratory investigation and of commercial usage, it has been found that with few exceptions, materials disclosed in the prior art fail to effectively remove the deposits from either the intake system or the combustion zones. These materials, although possibly producing a slight improvement in engine operating conditions, are unsatisfactory for the reason that removal or prevention of carbon deposits and gum in both the intake and combustion system is not effected.

In an effort to overcome the deficiencies of the earlier carbon and gum removing agents, frequently referred to as solvents, resort has been had to those materials which have a stronger and more powerful action, such as halogenated organic compounds. The use of such materials frequently resulted in the corrosion of engine parts which, of course, was highly undesirable. The effect of simply increasing the amount of solvent additive has also been tried but this change generally results in increasing the deposit in the combustion zone, apparently as a result of carbonization of the solvent itself or as a result of the effect of the solvent action in the intake system, causing removal of the deposit there and the carrying of the deposit into the combustion zone where, due to the difference in conditions, such as temperature and pressure, deposition of material resulted and the deposit in the combustion zone increased.

In application, Serial No. 233,613, filed October 6, 1938, entitled "Motor fuel composition," and application, Serial No. 348,164, filed July 26, 1940, entitled "Compositions for treating motors and for addition to motor fuel," which is a continuation-in-part of the first-mentioned application, there are disclosed solvent compositions which have been found to be very effective in inhibiting the formation of carbon deposits in, and removing carbon deposits from, internal combustion engines. The materials used in preparing solvent compositions in accordance with these applications are (1) a compound or a mixture of compounds boiling over 350° F. having excellent gum solvent properties at elevated temperatures and which may or may not have good gum solvent properties at ordinary temperatures and which are selected from the group consisting of esters of aliphatic dicarboxylic acids, esters of aromatic acids, cyclic (including aromatic) ketones and aliphatic alcohols; (2) a compound or a mixture of compounds boiling below 350° F. having good solvent properties at ordinary temperatures and selected from the group consisting of esters of aliphatic acids, aliphatic alcohols and aliphatic ketones. Examples of the first group include amyl phthalate, benzyl benzoate, ethyl benzoate, dibutyl phthalate, butyl tartrate, butyl benzoate, benzophenone, acetophenone, furfuralacetone and octyl alcohol. Examples of group 2 include ethyl butyl acetate, methyl amyl acetate, acetone, methyl amyl ketone, ethyl alcohol and ethyl acetate. The esters referred to in the aforementioned groups of compounds are of that class of compounds that are true esters, i. e., organic salt formed from an alcohol and from an organic acid by elimination of water.

The efficiency of solvent compositions containing the aforementioned groups of materials was found to be greatly enhanced by admixing a vehicle therewith. Suitable vehicles include a refined mineral oil fraction or a mineral oil distillate boiling with the range of 350 to 850° F., gas oil and mineral oil having a viscosity between approximately 70 and 500 seconds Saybolt Universal at 100° F., particularly white mineral oil. Other vehicles, either hydrocarbon or non-hydrocarbon, may be used provided they have good penetrating and wetting characteristics with respect to the deposits.

The afore-described solvent compositions were shown to be very effective when employed in stock automotive engines currently available at the time the investigation was carried out, most of the work being done in 1937. However, since that time numerous changes in design and changes in operating conditions have been brought about in automotive internal combustion engines. As a result of such changes, it has been noted that the ability of such solvent compositions for removing carbon deposits is frequently not as effective as is desired.

It has now been found that the effectiveness of such solvent compositions may be greatly enhanced particularly with respect to the efficacy of the compositions when used in recent model automotive internal combustion engines, by incorporating therewith a small amount of one or more compounds soluble in mixtures of compounds of groups 1 and 2 and selected from group 3 hydroxy benzenes including mono-, di- and trihydroxy benzenes and alkyl substituted hydroxy benzenes and particularly alkyl mono-hydroxy benzenes in which the alkyl groups contain not more than three carbon atoms. Examples of this group of materials include phenol, resorcinol, thymol, pyrocatechol, pyrogallol, ethyl phenol, carvacrol, cresorcinol and cresols. Commercial cresols, which are mixtures of the various cresols and phenol, have been found to be particularly effective. One such commercial cresol had the following approximate composition: o-cresol 70%; m-cresol 10%; p-cresol 10%; phenol 10%.

In addition it has been found that certain low-boiling, i. e., boiling below approximately 350° F., aromatic hydrocarbons such as benzene, toluol, alkyl benzenes, particularly low boiling alkyl benzenes such as those having not more than three carbon atoms in the alkyl groups and low boiling aromatic-containing liquids of petroleum origin of which naphtha sold under the trade-mark "Solvesso" is an example, are suitable as members of group 2 of the aforementioned solvent compositions.

The preferable approximate proportions by volume of the various groups of the aforementioned materials which are used in solvent compositions in accordance with this invention are as follows:

Group 1, maximum 10%—minimum 5%; group 2, maximum 20%—minimum 5%; group 3, maximum 20%—minimum 5%; vehicle, maximum 85%—minimum 50%.

The quantity of such mixture which, when incorporated in motor fuel, is necessary to effectively remove and/or minimize gum and carbon deposits may vary considerably depending on the type of engine, condition of engine, the particular fuel employed and the operating conditions encountered. A maximum of 5% and usually not over 1% of solvent, based on the volume of motor fuel, is sufficient. Generally speaking, larger proportions are employed when relatively large proportions of vehicle are used in the solvent compositions. In general, it has been found that from 0.1% to 0.5% of solvent gives particularly satisfactory results. The amount of solvent to be used will also vary within the limits specified with different engines and with the type of service to which the engine is subjected. It has been found by experiment that in some cases, deviation from the proportions specified not only diminishes the efficacy of the solvents, but actually increases the deposit in the combustion zone.

As a specific example, 80 parts by volume of a refined white mineral oil having the following characteristics:

| | |
|---|---|
| S. U. viscosity at 100° F | 70–75 |
| Color, Saybolt | +25 |
| Flash (C. O. C.) degrees F | 350–360 |
| Fire do | 400–420 | was blended with 5 parts by volume of dibutyl phthalate, 10 parts by volume of ethyl acetate and 5 parts by volume of commercial cresol. The commercial cresol employed contained approximately 35% ortho, 40% meta and 25% para cresol, as well as small amounts of phenol and xylenols. This mixture was employed in gasoline in the proportion of 99.8% by volume of gasoline and 0.2% by volume of solvent mixture.

When the aforementioned gasoline-solvent fuel mixture was used in internal combustion engines it effectively minimized the tendency of formation of gum and carbon deposits in both the intake system and combustion zone and in those engines where deposits of gum and carbon were already present and were interfering with efficient operation, the deposits were substantially decreased and/or removed, thereby restoring the engine to higher operating efficiency. The beneficial results obtained can be more fully appreciated when considered in the light of the reduced octane requirement of the motor fuel necessary to produce a given standard of operation. This is clearly brought out by the curves shown in Figure 1.

These curves demonstrate the increase or decrease in octane requirement of an internal combustion engine on dynamometer block tests, at different engine speeds resulting from the use of a good grade of straight commercial gasoline and the same gasoline containing commercial cresol, a solvent consisting of a mixture of white oil, dibutyl phthalate and ethyl acetate and a solvent composition in accordance with this invention, which has the same composition as the aforementioned solvent mixture except that a portion of the dibutyl phthalate is replaced with cresol. In each case the additive was added to the gasoline in the amount of 0.2% by volume of the gasoline. The engine employed for this work was a 1941 stock Chrysler, 6-cylinder engine, Model C-28, having a compression ratio of 6.8 to 1. The points on the curves were obtained by applying a dynamometer load to the engine on the block as described on the last page of the article entitled "Engine Deposits" by Joseph A. Moller and Harry L. Moir, appearing on pages 250 to 261, inclusive, of the June 1940 issue of the S. A. E. Journal. At the intervals indicated on the drawing, the supply of fuel was cut off and a series of reference fuels of known octane number fed to the engine. For each reference fuel, the engine was gradually loaded and unloaded and the speed at which knocking became audible during loading and faded out during unloading was determined. The average of these two speeds was plotted against the octane number of the reference fuel for each fuel. A curve was then drawn through these points and from the curve the octane requirement at any desired speed could be determined. By plotting these octane requirements, obtained every four hours, the curves shown in Figure 1 were obtained.

It will be seen from the curves that in the initial stages of the test, when straight gasoline was employed as the fuel, the octane requirement of the engine gradually increased over a period of twenty-four hours of operation, the average increase in octane requirement being of the order of 1.5 octane numbers. When the same engine was run for twenty hours on the same gasoline containing 0.2% by volume of cresol, the octane requirement contained to increase slightly, although at the completion of eight hours of operation, the octane requirement was noticeably diminished. This condition, however, did not continue and upon further operation, as shown by the curves, the octane requirement returned to and exceeded that which prevailed when the gasoline-cresol mixture was first employed as the fuel.

The engine was again operated on straight gasoline, the duration of the run on this fuel being twenty hours, in order to allow ample time for the octane requirement of the engine to reach an equilibrium. At the end of this time a fuel was employed containing 0.2% by volume of solvent "A" which is a mixture consisting of 80% refined white mineral oil having the characteristics shown on page 2, 10% dibutyl phthalate, and 10% ethyl acetate. This solvent composition is disclosed in application, Serial No. 348,164, and is shown therein to have considerable merit for improving the operating efficiency of stock internal combustion engines then available. After sixteen hours of operation on this fuel, the octane requirement of the engine, although not diminished, had increased only slightly indicating that the solvent composition produced some beneficial effect since otherwise the octane requirement would have increased a much greater amount as indicated by the curves covering the initial twenty-four hours of operation. The next fuel supplied to the engine consisted of the same commercial gasoline containing 0.2% by volume of solvent GA-51, which is a solvent having the same composition as solvent "A" except that 5% by volume of cresol is substituted for an equal amount of dibutyl phthalate, thus producing the following solvent composition: 80% refined white mineral oil, 5% dibutyl phthalate, 10% ethyl acetate and 5% cresol. The octane requirement of the engine began to diminish immediately and at the end of sixteen hours of operation, the octane requirement of the engine was reduced an average of about 5 octane numbers.

During the next eight hours of operation, the octane requirement increased somewhat but at the end of thirty-two hours of operation the octane requirement of the engine appeared to have reached an equilibrium. This equilibrium was approximately four octane numbers below the octane requirement of the engine at the time this fuel was first introduced. This is a much greater reduction of octane requirement than it has been possible to obtain using other combinations of materials or other commercial solvent compositions. It will be further observed that the decrease in octane requirement when using fuel containing solvent GA-51 was much greater than could possibly be anticipated as a result of the use of cresol alone or of solvent composition "A" when used in the same amounts. The effect of the solvent composition GA-51 is all the more impressive when it is considered that the normal tendency of the engine during the course of continued operation is to increase in octane requirement, whereas the octane requirement of the engine when using solvent GA-51, as shown by the last eight hours of operation, reached an equilibrium beyond which the octane requirement of the engine did not increase. This is believed to be due to the fact that the solvent substantially completely eliminated the tendency of the fuel to produce deposits in the intake and combustion chamber areas which deposits ordinarily tend to increase the octane requirement of the engine.

Although the use of the novel gum solvents has been more particularly described in connection with removal of gum and carbonaceous deposits from the intake and combustion zones of automotive engines, the solvents being incorporated in motor fuels, it is to be understood that the solvents per se may be directly applied to engine parts. The solvent compositions are also useful as additives to motor oils and to lubricating oils in general where the problem of gum and carbon deposition is encountered. For example, when added in amounts ranging from 1% to 5% by volume to motor oils, deposition of carbon on the piston rings are substantially minimized and removed. Likewise, gum deposition is substantially avoided when the gum solvents are used in the same proportions in industrial lubricating oils as, for example, spindle oils. When used in lubricating oils the solvent does not require the addition of vehicle since the oil itself acts as a vehicle.

The solvent compositions may also be used in fuels employed in compression ignition engines. When used in such fuels, frequently referred to as Diesel fuels, the solvent compositions are preferably used in amounts of about 0.1% to 5% by volume of the final fuel. It is ordinarily unnecessary to use a vehicle in the solvent compositions used in Diesel fuels, since the fuel itself acts as a vehicle but in those Diesel fuels in which a large portion of the fuel boils within the gasoline boiling range, it will be found advantageous to include a vehicle.

The foregoing general description of the invention and the specific examples described are sufficient to enable one skilled in the art to appreciate the value thereof. The invention is not limited to the specific examples disclosed or to any particular theory or mechanism of the action of the solvent but is to be interpreted as broadly as the prior art permits in view of the following claims.

What is claimed is:

1. A composition useful as a gum solvent comprising 5% to 10% of material boiling above 350° F. having good gum solvent properties at elevated temperatures and selected from the group consisting of (1) esters of aliphatic dicarboxylic acids, esters of aromatic acids, cyclic ketones and aliphatic alcohols; 5% to 20% of material boiling below 350° F. having good gum solvent properties at ordinary temperatures and selected from the group consisting of (2) esters of aliphatic acids, aliphatic alcohols, aliphatic ketones, benzene, alkyl benzenes and aromatic naphtha; 5% to 20% of (3) hydroxy benzene and not less than 50% of a liquid vehicle for the aforesaid materials, which has good penetrating and wetting characteristics with respect to the gum to be treated.

2. A composition useful as a gum solvent comprising approximately 5% to 10% of material boiling above 350° F. having good gum solvent properties at elevated temperatures and selected from the group consisting of (1) esters of aliphatic dicarboxylic acids, esters of aromatic acids, cyclic ketones and aliphatic alcohols; approximately 5% to 20% of material boiling below 350° F. having good gum solvent properties at ordinary temperatures and selected from the group consisting of (2) esters of aliphatic acids, aliphatic alcohols, aliphatic ketones, benzene, alkyl benzenes and aromatic naphtha; approximately 5% to 20% of (3) hydroxy benzene and approximately 50% to 85% of mineral oil vehicle.

3. A composition in accordance with claim 2 in which the material from group 1 is an ester of phthalic acid, the material from group 2 is an ester of acetic acid, and the material from group 3 is a cresol.

4. A composition in accordance with claim 2 in which the material from group 1 is dibutyl phthalate, the material from group 2 is ethyl acetate, and the material from group 3 is commercial cresol.

5. A motor fuel comprising hydrocarbons of gasoline boiling range containing approximately 0.1% to 5% of a solvent composition comprising 5% to 10% of material boiling above 350° F. having good gum solvent properties at elevated temperatures and selected from the group consisting of (1) esters of aliphatic dicarboxylic acids, esters of aromatic acids, cyclic ketones and aliphatic alcohols; 5% to 20% of material boiling below 350° F. having good gum solvent properties at ordinary temperatures and selected from the group consisting of (2) esters of aliphatic acids, aliphatic alcohols, aliphatic ketones, benzene, alkyl benzenes, and aromatic naphtha; 5% to 20% of (3) hydroxy benzene and not less than 50% of a liquid vehicle for the aforesaid materials, which has good penetrating and wetting characteristics with respect to the gum to be treated.

6. A motor fuel comprising hydrocarbons in gasoline boiling range containing approximately 0.1% to 5% of a solvent composition comprising approximately 5% to 10% of material boiling above 350° F. having good gum solvent properties at elevated temperatures and selected from the group consisting of (1) esters of aliphatic dicarboxylic acids, esters of aromatic acids, cyclic ketones and aliphatic alcohols; approximately 5% to 20% of material boiling below 350° F. having good gum solvent properties at ordinary temperatures and selected from the group consisting of (2) esters of aliphatic acids, aliphatic alcohols, aliphatic ketones, benzene, alkyl benzenes and aromatic naphtha; approximately 5% to 20% of (3) hydroxy benzene and approximately 50% to 85% of mineral oil vehicle.

7. A motor fuel in accordance with claim 6 in which the material from group 1 is an ester of phthalic acid, the material from group 2 is an ester of acetic acid, and the material from group 3 is a cresol.

8. A motor fuel in accordance with claim 6 in which the material from group 1 is dibutyl phthalate, the material from group 2 is ethyl acetate, and the material from group 3 is commercial cresol.

9. A motor fuel comprising hydrocarbons of gasoline boiling range containing approximately 0.1% to 5% of a solvent composition comprising the following materials in the following approximate proportions:

|  | Per cent |
|---|---|
| Dibutyl phthalate | 5 |
| Ethyl acetate | 10 |
| Commercial cresol | 5 |
| Refined mineral oil | 80 |

10. A motor fuel in accordance with claim 9 which contains approximately 0.2% of solvent composition.

11. A Diesel fuel comprising hydrocarbons, the major portion of which boil above gasoline boiling range and containing approximately 0.1% to 5% of a solvent composition comprising 5% to 10% of material boiling above 350° F. having good gum solvent properties at elevated temperatures and selected from the group consisting of (1) esters of aliphatic dicarboxylic acids, esters of aromatic acids, cyclic ketones and aliphatic alcohols; 5% to 20% of material boiling below 350° F. having good gum solvent properties at ordinary temperatures and selected from the group consisting of (2) esters of aliphatic acids, aliphatic alcohols, aliphatic ketones, benzene, alkyl benzenes, and aromatic naphtha and 5% to 20% of (3) hydroxy benzene.

12. A fuel in accordance with claim 11 in which the solvent composition contains approximately 5% to 10% of material of group 1, approximately 5% to 20% of material from group 2 and approximately 5% to 20% of material of group 3.

13. A lubricant comprising mineral lubricating oil containing approximately 0.1% to 5% of a solvent composition comprising 5% to 10% of material boiling above 350° F. having good gum solvent properties at elevated temperatures and selected from the group consisting of (1) esters of aliphatic dicarboxylic acids, esters of aromatic acids, cyclic ketones and aliphatic alcohols; 5% to 20% of material boiling below 350° F. having good gum solvent properties at ordinary temperatures and selected from the group consisting of (2) esters of aliphatic acids, aliphatic alcohols, aliphatic ketones, benzene, alkyl benzenes, and aromatic naphtha and 5% to 20% of (3) hydroxy benzene.

14. A lubricant in accordance with claim 13 in which the solvent composition contains approximately 5% to 10% of material of group 1, approximately 5% to 20% of material of group 2 and approximately 5% to 20% of material of group 3.

WILLIAM J. BACKOFF.
NORMAN D. WILLIAMS.